M. Stephens.
Joint for Cement Pipes.
No. 94,146.      Patented Aug 24, 1869.

Witnesses,
Chas H Smith
Geo. D Walser

Melvin Stephens

United States Patent Office.

MELVIN STEPHENS, OF BROOKLYN, NEW YORK, ASSIGNOR TO HIMSELF AND NATHAN STEPHENS, OF SAME PLACE.

Letters Patent No. 94,146, dated August 24, 1869.

IMPROVEMENT IN JOINTS FOR CEMENT-PIPES.

The Schedule referred to in these Letters Patent and making part of the same.

*To all whom it may concern:*

Be it known that I, MELVIN STEPHENS, of Brooklyn, in the county of Kings, and State of New York, have invented and made a certain new and useful Improvement in Joints for Cement-Pipes; and I do hereby declare the following to be a full, clear, and exact description of the said invention, reference being had to the annexed drawing, making part of this specification, wherein—

Similar marks of reference denote the same parts.

Figure 1:
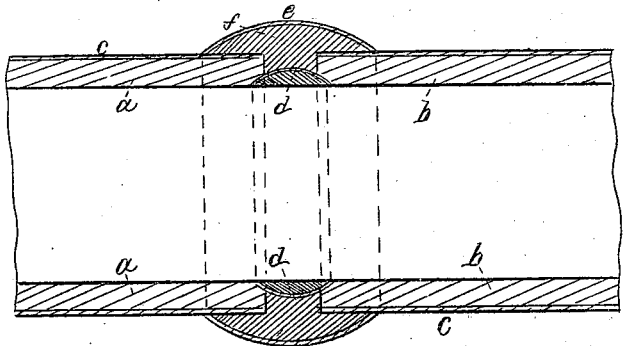
Figure 1 is a section longitudinally of a pipe and joint.

Cement-pipes have heretofore been made, in which a sheet-iron tube is lined with cement, and the joints between these pipes have been made by setting the ends of the sections closely together, and then pressing cement around the joint, and sometimes a metal ring has been used to surround the cement.

This mode of construction is objectionable, because the cement does not unite the flat surfaces of the cement lining that come together, and the water sometimes works out between the joint, and along the iron surface between that and the cement collar, and in many instances the cement lining contracts away from the iron casing, and water works in at the ends of the pipes, and escapes at the laps in the iron casing.

My invention obviates the beforementioned difficulties, makes a very strong and perfect joint, saves cement, facilitates construction, and lessens the expense.

In the drawing—

*a* and *b* represent portions of cement pipes, formed in any usual manner, *c c* being the sheet-iron casing of said pipes.

Instead of bringing the ends of the pipes as close together as convenient, I make use of the ring *d*, that is formed of sheet-metal, and convex on its outer surface, so that the edges of the ring can slip into the ends of the sections of pipe, but the convexity of the exterior of the ring prevents the parts being pressed together beyond a certain point.

This ring *d* may be filled with cement, so that the inner surface of the pipe at the joint may be smooth, or nearly so, and this ring facilitates the laying of pipe when one length is not on the same line as the other.

The workman fills the space between the pipes with cement.

It is best to moisten the ends of the pipe in the first instance, and the cement is to be pressed into the joint by the workman's hand, or tool applied to "wipe" the cement around the joint, and thereby unite the cement lining itself, and prevent leakage.

In order to form an exterior protection to the joint, I use a second ring, *e*, made of sheet-metal, and concave on the inside, in order that the edges of the ring may set closely to the exterior of the pipe, and a space be left, between the ring and pipe, for cement, as at *f*.

Figure 2:
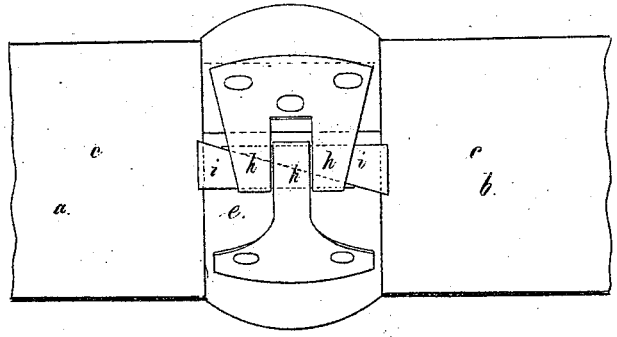
Figure 2 is a plan of the ring and keys for tightening the same.
Figure 3:
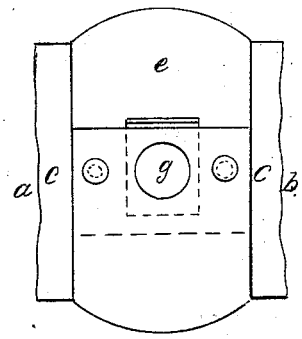
Figure 3 represents the ring and opening for introducing cement.

This ring *e* may be made to fit the exterior of the pipe, and be slipped over the joint, as prepared in the manner before described, and then the space *f* filled, by pouring or pressing the cement in through a hole, as seen at *g*, fig. 3, or the ring *e* may be made to open, as seen in fig. 2; in which case the workman wipes around the joint, leaving sufficient cement projecting to fill the space *f*, and then the sections of rings are applied, or the rings sprung open and passed over the cement, and drawn closely around the same, to consolidate it, and hold the cement tightly upon the joint.

*h h* are tongues or loops applied to the ends of the ring *e*, through which the key or keys *i* are inserted, to firmly hold the band to its place.

In repairing cement-pipes, it frequently happens that one pipe cannot be pressed up against the next; hence an internal ring, in the form shown in fig. 1, could not be employed.

Figure 4:
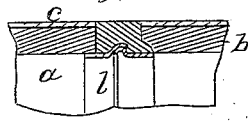
Figure 4 is a section of part of a joint.

I, therefore, provide a sheet-metal ring, *l*, fig. 4, of a size to fit the interior of the pipe, and with a bead or flange on one edge, so as to prevent its slipping into the pipe, and insert the same as in fig. 4, and introduce the section of pipe or stop-cock into the required place.

Figure 5:
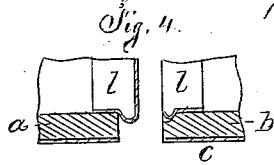
Figure 5 represents the joint as partially made.

I then slip the ring *l* out, until it reaches the end of the other pipe, or until the flanges or ribs and beads of the two (if two are used) interlock, as in fig. 5.

The flanges or beads facilitate the moving of the ring by a tool introduced at the joint.

The joint is rendered water-tight, by cement applied around said ring *l*, and between the ends of the pipes, or a winding of twine and white lead, or other material, may be introduced, to form the filling of the joint.

By my improvement the cement of the lining is durably united, hence there cannot be any leakage, as has heretofore sometimes been the case, by water passing between the cement at the ends of the pipe, thence between the sheet-iron and the cement, and thence escaping where the sheet-iron is lapped and riveted.

This joint is much stronger than those before made, and the earth, in filling the trench, does not injure the cement around the joint.

What I claim, and desire to secure by Letters Patent, is—

1. A ring, applied within and between the ends of cement or other pipes, to sustain the cement or other material introduced to make a joint between such pipes, substantially as set forth.

2. The rings $l$ and $z$, constructed and applied in the manner and for the purpose specified.

3. The concave ring $e$, fitted so as to be opened, and provided with means for drawing the ends together and securing the same, so as to confine and consolidate the cement and hold the ends of the pipes, as set forth.

In witness whereof, I have hereunto set my signature, this 5th day of March, A. D. 1869.

MELVIN STEPHENS.

Witnesses:
   CHAS. H. SMITH,
   GEO. T. PINCKNEY.